United States Patent [19]

Losego

[11] Patent Number: 5,064,012

[45] Date of Patent: Nov. 12, 1991

[54] SYSTEM FOR MOTORIZING A SHOPPING CART OR TROLLY, OR THE LIKE

[76] Inventor: Martine Losego, 23, rue Denis Papin - F 19100, Brive, France

[21] Appl. No.: 422,510

[22] Filed: Oct. 17, 1989

[51] Int. Cl.⁵ .............................................. B62B 51/04
[52] U.S. Cl. .................................. 180/19.1; 180/65.1; 180/68.5; 280/33.992; 280/DIG. 4
[58] Field of Search ......... 280/33.992, 304.1, DIG. 4, 280/33.991; 180/19.1, 68.5, 65.1, 65.8; 104/34; 320/2; 200/51.09

[56] References Cited

U.S. PATENT DOCUMENTS

| | | | |
|---|---|---|---|
| 3,190,386 | 6/1965 | Swinny | 280/33.992 |
| 3,575,250 | 4/1971 | Dykes | 280/33.992 |
| 4,096,920 | 6/1978 | Heyn | 280/33.992 |
| 4,167,983 | 9/1979 | Seider | 180/19.1 |
| 4,484,755 | 11/1984 | Houston | 280/33.992 |

FOREIGN PATENT DOCUMENTS

| | | |
|---|---|---|
| 2557987 | 7/1985 | France . |
| 2587291 | 3/1987 | France . |
| 2591179 | 6/1987 | France . |
| 2604662 | 4/1988 | France . |
| 2610256 | 8/1988 | France . |

Primary Examiner—David M. Mitchell
Attorney, Agent, or Firm—Dennison, Meserole, Pollack & Scheiner

[57] ABSTRACT

A system for motorizing a shopping cart or the like, the system comprising: a) a drive unit including an electric motor and a motor control circuit; b) a manual control member situated close to the push bar and suitable for acting on the control circuit for controlling both forwards and backwards displacement of the cart; c) a transmission between the motor and at least one wheel of the cart; d) a rechargeable storage battery for powering the motor; e) a feed bar suitable for recharging the battery from a fixed electrical charger, said bar having a front end and a rear end such that its front end is suitable for forming an electrical contact with the rear end of the bar of the preceding cart in a row, with the first cart in a row being connected directly to the charger; f) an electrical connection between said bar and the positive terminal of the battery, when said electrical contact is established between the two above-mentioned bars; and g) a permanent electrical connection between ground constituted by the chassis and the negative terminal of the battery.

18 Claims, 5 Drawing Sheets

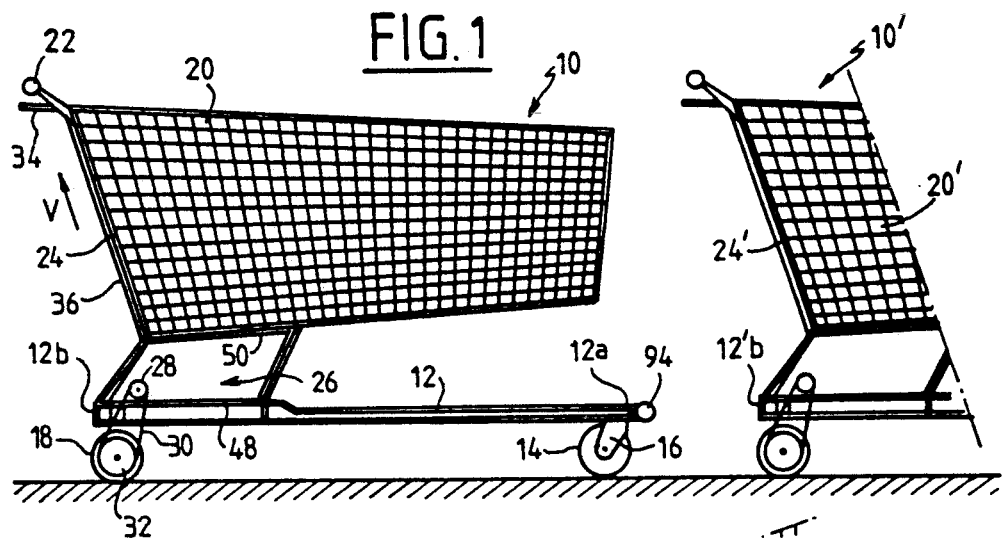
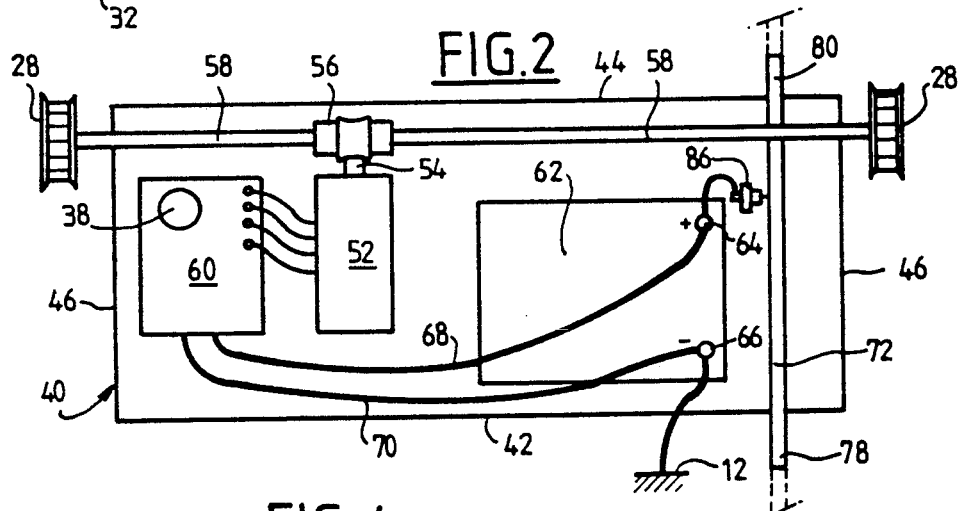
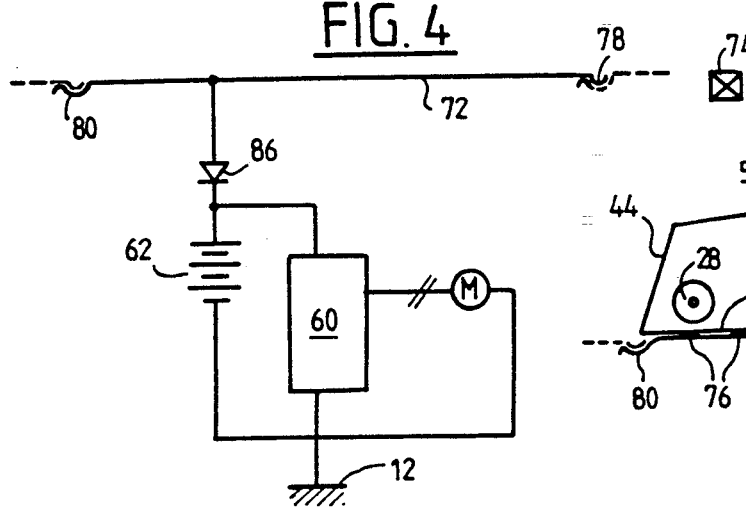

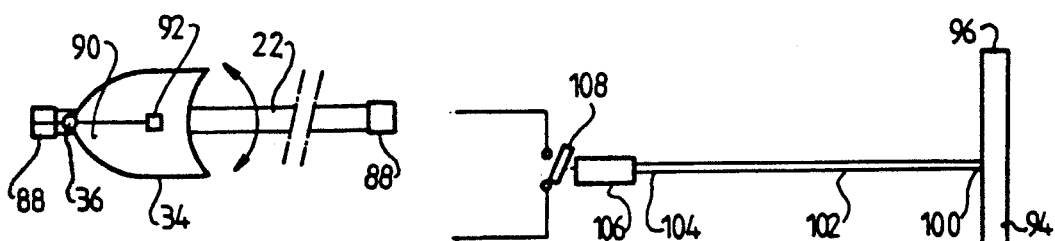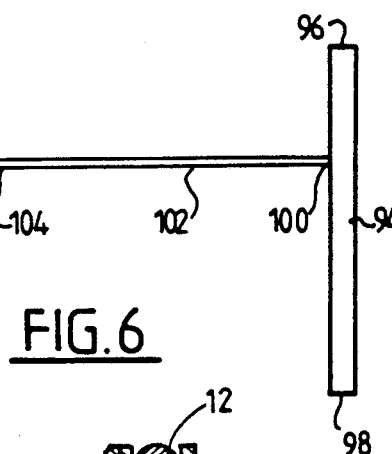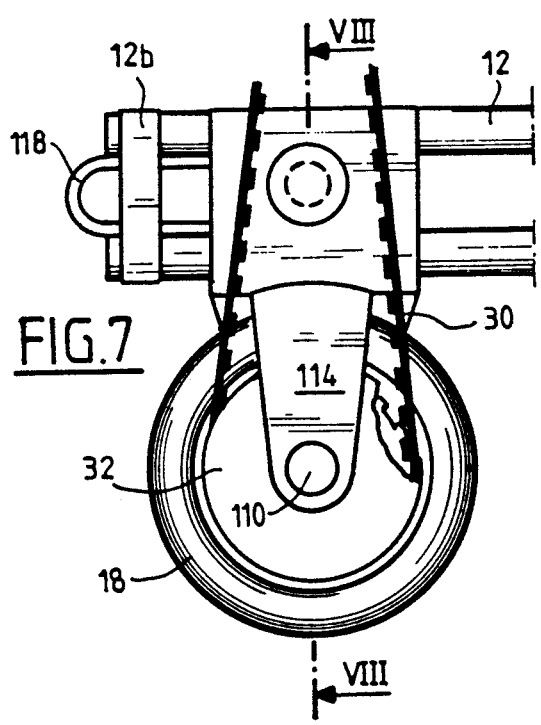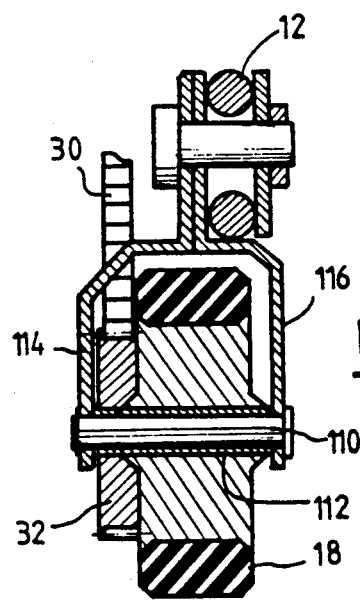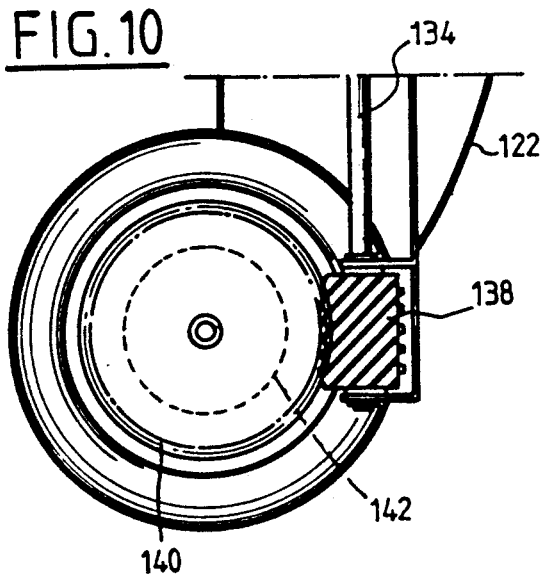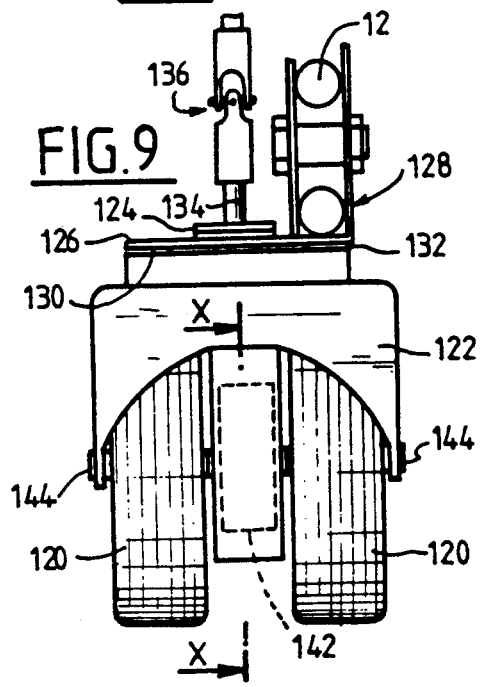

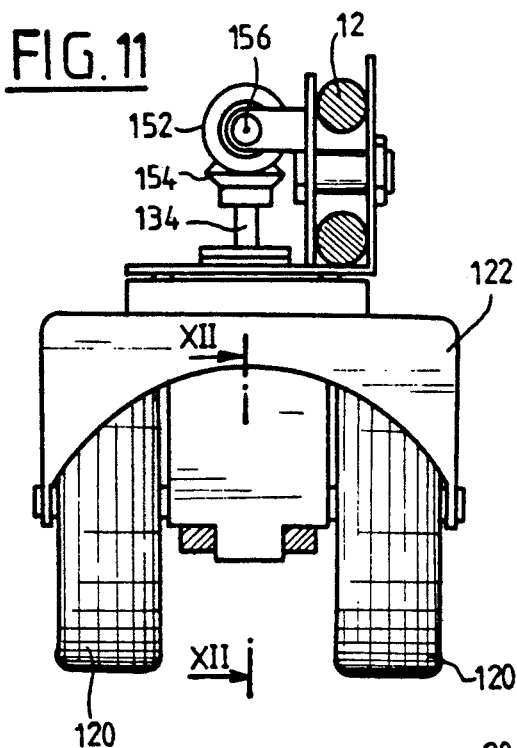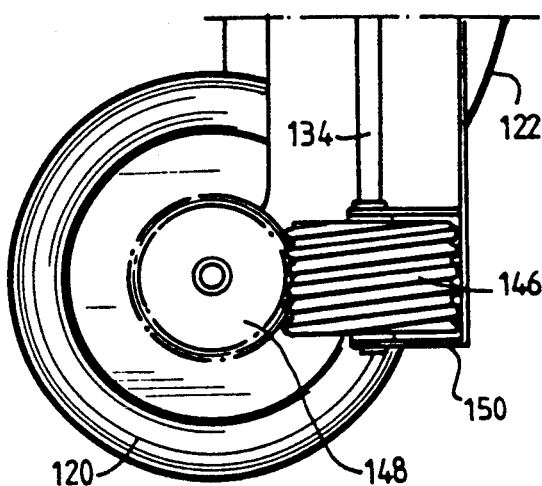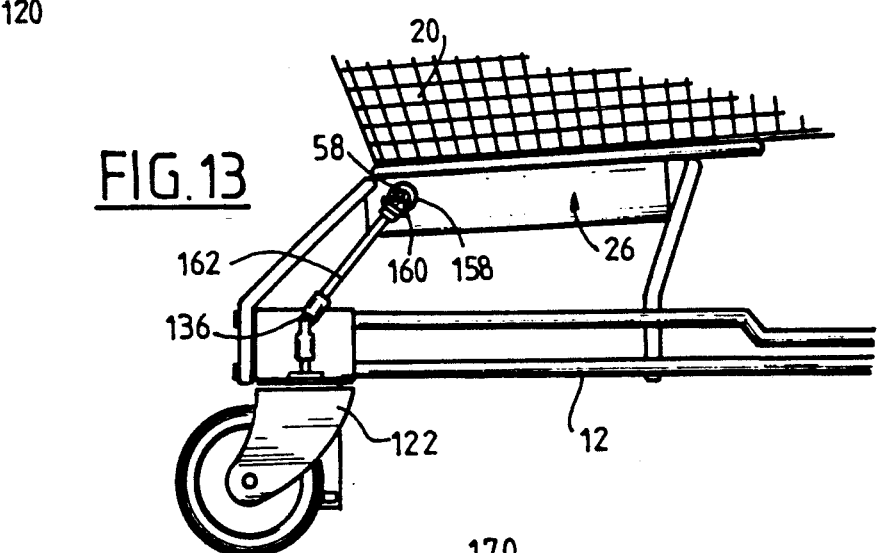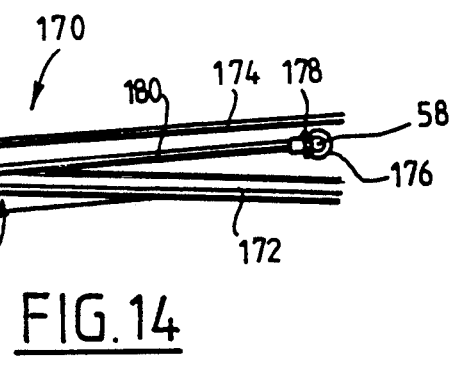

SYSTEM FOR MOTORIZING A SHOPPING CART OR TROLLY, OR THE LIKE

The present invention relates to a system for motorizing a shopping cart or trolley, or the like.

BACKGROUND OF THE INVENTION

Carts of this type already exist for transporting shopping or baggage, particularly in supermarkets, railway stations, or airports.

In outline, a cart of this type comprises a wheeled chassis, a push bar, and load-carrying means, the chassis having front and rear ends which are suitable for enabling the front end of one cart to be nested in the rear end of an identical cart which is ahead of it in a row, thereby saving space at a cart parking location in a supermarket, on a railway platform, or in an airport.

In the special case of shopping carts, the load-carrying means are constituted by a basket having a retractable wall for facilitating nesting or stacking of the carts.

Although such carts are designed to be pushed by a user pushing the push bar provided at the rear of the cart, efforts have been made over several years to motorize such carts in order to reduce the amount of force a user normally needs to exert in order to move a cart forwards, thereby making a cart more comfortable to use.

Thus, as described in U.S. Pat. No. 4,096,920, proposals have been made to fit a shopping cart with a single drive wheel and to provide a retractable trailer behind the cart serving firstly to control contact between the drive wheel and the ground and secondly to transport the user. If the user's weight is displaced towards the rear of the trailer, then the drive wheel is disengaged from the ground and a brake is caused to rub against the ground.

This prior system suffers from several drawbacks, in particular the risk of accidents due to the possibility of the user falling off the trailer. In addition, the trailer represents significant mass which is added to the mass of the cart and this makes it awkward to use the cart in the event of a breakdown.

Proposals are made in French patent number 85 13621, published under the number 2 587 291, to place a motor assembly directly between the two wheels on a single axle of a shopping cart. This assembly is essentially constituted by a motor driving a differential having outlet shafts driving the wheels directly. It is a direct drive device also including a source of energy (storage battery or solar cells), a device for controlling the speed of rotation of the motor, an electromagnetic brake, and a brake provided by the back electromotive force (emf) from the motor. This system nevertheless suffers from numerous drawbacks: the disposition of the motor between the wheels prevents carts from being nested or stacked; there is no speed reduction between the motor and the wheels which requires a motor to be used which is capable of rotating at low speed while providing high torque; no reversing facility is provided; no means are provided for automatically connecting the storage battery to a charger; and finally the use of solar cells is utterly impracticable.

More recently, in French patent application number 86 13906, published under the number 2 604 662, the present Inventor has proposed a system for motorizing supermarket carts which also allows carts fitted in this way to be nested or stacked. This system includes a motor provided with a stepdown gear box and driving a differential gear whose outlet shafts are provided with wheels suitable for imparting friction drive to respective tires of two wheels of the cart. The system also provides reverse drive and means for automatically ensuring progressive starting and stopping.

This prior device also suffers from drawbacks: no means are provided for automatically recharging its battery; the friction drive gives rise to rapid wear of the drive-imparting wheels and of the tires of the driven wheels, and also to sliding of the drive wheels on the driven wheels if it is raining or a greasy or other liquid is accidentally split on the ground. In addition, this prior system is suitable for fitting to shopping carts only.

Further, in French application number 87 01046, published under the number 2 610 256, the present Inventor discloses various improvements to the motorizing system of French patent application number 86 13906. In particular, means are described for automatically recharging the battery of the motorizing system.

However, this system still suffers from drawbacks in that the batteries are recharged only if the cart is properly positioned in the preceding cart of a parked row of supermarket carts or the like.

Also, the means for controlling the motorizing system are not very convenient to use, in particular since it is necessary to provide a reversing switch.

Consequently, one of the aims of the present invention is to provide a system for motorizing a shopping cart or the like which avoids the drawbacks of prior systems.

A particular aim of the invention is to provide such a motorizing system which is capable of being mounted easily on various different types of cart, including shopping carts and baggage carts.

Another aim of the invention is to provide a system which is easy for a user to use, which is rugged, and which is sufficiently compact to enable carts to be nested or stacked.

Another aim of the invention is to provide such a motorizing system which has all of the safety features desirable for the user, and which has a storage battery that is easily recharged when the cart is nested in a parked row of carts on a supermarket forecourt, or the like.

SUMMARY OF THE INVENTION

The present invention provides a system for motorizing a shopping cart or the like, said cart comprising a chassis provided with wheels, a push bar, and load-carrying means, said chassis having a front end and a rear end such that the front end is suitable for being nested in the rear end of an identical cart preceding it in a row of carts, the system comprising:

a) a drive unit including an electric motor and a motor control circuit;

b) a manual control member situated close to the push bar and suitable for acting on the control circuit for controlling both forwards and backwards displacement of the cart;

c) transmission means between the motor and at least one wheel of the cart;

d) a rechargeable storage battery for powering the motor;

e) a feed bar suitable for recharging the battery from a fixed electrical charger, the bar having a front end and a rear end such that its front end is suitable for forming an electrical contact with the rear end of the bar of the preceding cart in a row, with the first cart in a row being connected directly to the charger;

f) means for providing an electrical connection between said bar and the positive terminal of the battery, when said electrical contact is established between the two above-mentioned bars; and g) a permanent electrical connection between ground constituted by the chassis and the negative terminal of the battery.

Such a system makes it easy to nest or stack carts, with the batteries being automatically recharged during such stacking from a fixed charger.

Advantageously, the electric motor is a stepper motor and the control circuit includes means for applying a logic level signal suitable for determining the direction of rotation of the motor and means for applying a clock signal at variable frequency for controlling the speed of rotation of the motor.

Preferably, the electric motor drives a differential gear via a stepdown gear, the differential gear having two outlet shafts each of which is coupled to at least one wheel by said transmission means.

In a preferred embodiment of the invention, the recharging bar is formed by a flat spring which is fixed to the drive unit by insulating mechanical means and which projects beyond the front and the rear of the drive unit.

Advantageously, the rear end of the recharging bar is fixed and is curved downwards while its front end is flexible and forms a ramp followed by a stop notch suitable for locking to the rear end of the recharging bar of the preceding cart in order to provide electrical contact between said flexible front end and the fixed rear end, the means for providing an electrical contact between the bar and the positive terminal of the battery including a circuit breaker controlled by the flexible front end of the bar with the electrical connection being established when the front end has deflected by a given amount.

As a result, when the cart is nested in the preceding cart in a row of waiting carts, recharging current does not flow so long as the front end of the cart's recharging bar has not been deflected and is not in contact with the rear end of the bar of the preceding cart. This prevents any sparking which would otherwise occur on first contact between the two above-mentioned recharging bars.

According to an advantageous feature of the invention, the recharging bar is connected to the positive terminal of the battery via a diode which allows electrical current to flow only when the electrical tension of the bar is greater than the tension of the positive terminal of the battery. This prevents any untimely discharging of the battery.

In addition, the invention advantageously provides means for detecting the state of charge of the battery and declutching means coupled to said detection means for declutching the motor when the battery charge is below a predetermined reference value.

This prevents the charged battery of a cart from discharging through its recharging bar into the batteries of the other carts being charged. It also avoids any battery becoming totally discharged which would cause it to wear out prematurely.

Advantageously, the manual control member comprises a handle placed beneath the push bar and fixed to one of the two ends of a substantially vertical shaft whose opposite end is connected to a potentiometer forming a part of the motor control circuit.

The handle is suitable for pivoting forwards and backwards on either side of a neutral position, to cause the cart to move forwards and backwards respectively about the neutral position where the motor is switched off.

In accordance with another advantageous feature of the invention, the chassis of the cart is provided at its front end with a bumper constituted by a flexible pipe closed at both ends and connected at an intermediate point along its length to one end of a tube whose other end connects with a pressure sensor situated in the processor unit and suitable for acting on motor control to trigger a safety cycle whenever the flexible tube is crushed or compressed by a shock.

In a simplified embodiment of the invention, transmission takes place via non-swivelling wheels of the cart. In such a case, each of the output shafts from the differential gear is provided with a respective toothed pulley wheel driving, by means of a cog belt, a corresponding toothed pulley wheel which is coaxial with a non-swivelling wheel of the cart and which is constrained to rotate together with the wheel.

In a more elaborate embodiment, transmission takes place via swivelling wheels. In such a case, each of the outlet shafts of the differential gear drives a vertical transmission shaft disposed coaxially inside a hollow shaft which carries a support for a swivelling wheel, the transmission shaft causing the swivelling wheel to rotate.

In this more elaborate embodiment, the system enables the drive wheels to swivel through any angle, thereby making the cart easier to maneuver.

The invention also provides for coupling means to make it possible to tow the wheelchair of a handicapped person.

BRIEF DESCRIPTION OF THE DRAWINGS

Embodiments of the invention are described by way of example with reference to the accompanying drawings, in which:

FIG. 1 is a side view of a cart fitted with a motorizing system of the invention, and shown in a position where said cart is ready to be nested in a preceding cart;

FIG. 2 is a plan view of the drive unit of the motorizing system;

FIG. 3 is a side view of the drive unit shown in FIG. 2;

FIG. 4 is the electrical circuit diagram of the drive unit;

FIG. 5 is a view along arrow V in FIG. 1 showing the control member;

FIG. 6 is a diagram showing the bumper of the cart and the control circuit associated therewith;

FIG. 7 is a fragmentary view on a larger scale than FIG. 1 showing a drive wheel and its drive belt;

FIG. 8 is a section on line VIII—VIII of FIG. 7;

FIG. 9 is a front view of a pair of swivelling drive wheels;

FIG. 10 is a section view on line X—X of FIG. 9;

FIG. 11 is a view analogous to FIG. 9 showing another embodiment;

FIG. 12 is a section view on line XII—XII of FIG. 11;

FIG. 13 is a fragmentary view of a cart fitted with a different embodiment of a motorizing system of the invention;

FIG. 14 is a fragmentary view of a cart fitted with another embodiment of a motorizing system of the invention;

DETAILED DESCRIPTION

Figure 15:
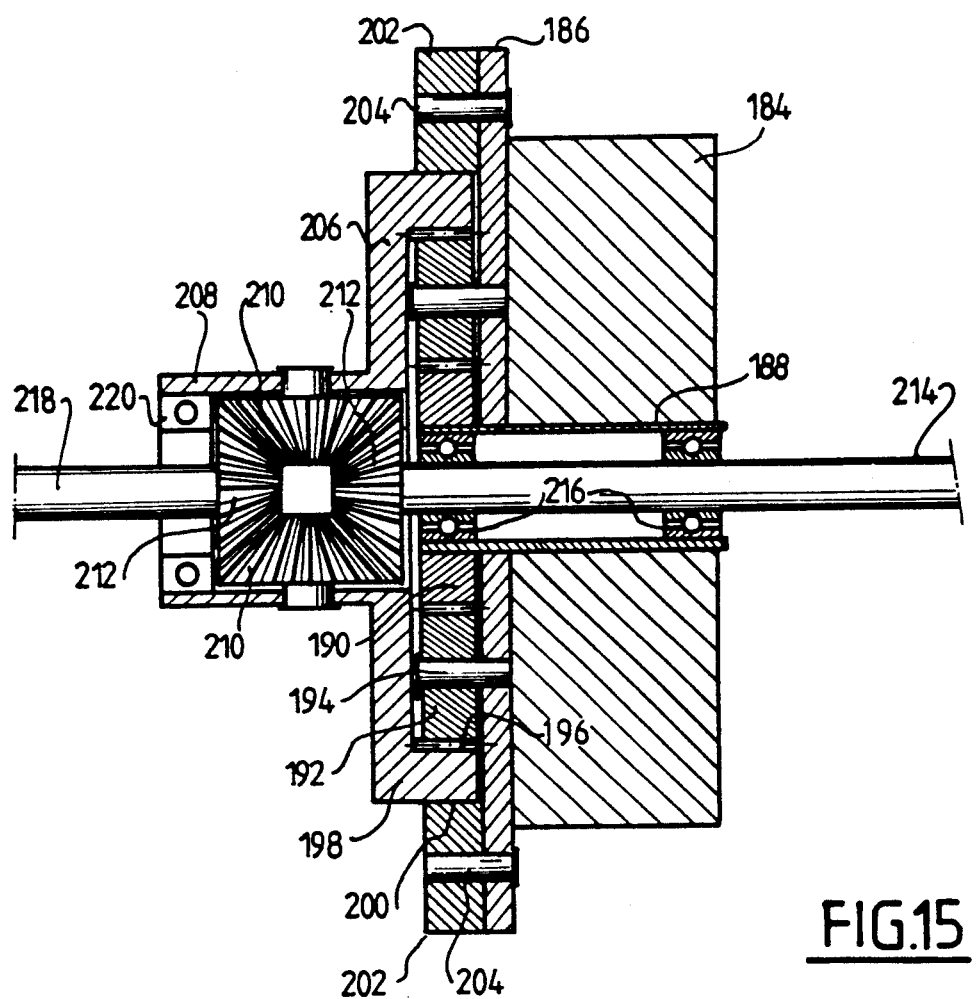
FIG. 15 is a section view through a motor and differential gear assembly of compact structure.

FIG. 1 shows a shopping cart 10 comprising a chassis 12 provided with two swivelling front wheels 14, each mounted on a swivelling support 16, and two non-swivelling rear wheels 18. The chassis 12 is also provided with a basket 20 for carrying a load and a push bar 22 disposed transversely at the rear of the chassis. The basket 20 is made from metal basketwork and it has a tilting rear wall 24.

The chassis 12 has a front end 12a which is narrower than its rear end 12b so that the front end 12a is suitable for nesting in the rear end 12b' of an identical cart 10' ahead of it in a row. Similarly, the shape of the basket 20 is suitable for then being nested in the basket 20' of the cart 10', with the rear wall 24' thereof being tilted up during nesting or stacking.

Carts as described above are well known and they are used, in particular, in supermarkets.

According to the invention, the chassis 12 is fitted with a drive unit 26 which, in the example shown, is placed adjacent to the rear portion 12b of the chassis beneath the basket 20. The unit 26 is suitable for rotating each of the two wheels 18 via transmission means. For each wheel 18, the transmission means comprise a toothed pulley wheel 28 over which a cog belt 30 passes, with the cog belt also passing over a toothed pulley wheel 32 which is coaxial with and constrained to rotate together with the corresponding wheel 18. The drive unit 26 is controlled by a control handle 34 situated close to the push bar 22 and fixed to the top end of a substantially vertical shaft 36 whose bottom end is connected to a potentiometer 38 (FIG. 2).

The drive unit 26 is housed in a protective housing 40 having a front wall 42, a rear wall 44, two symmetrical side walls 46, a bottom wall 48, and a top wall 50.

Inside the housing 40 (FIG. 2) there is a stepper motor 52 which drives a differential gear 56 via a step-down gear 54, the differential having two outlet shafts 58 having the two toothed pulley wheels 28 fixed respectively thereto. The motor 52 is controlled by a control circuit 60 which is powered by a rechargeable battery 62. The positive terminal 64 and the negative terminal 66 are respectively connected to the circuit 60 via two electric cables 68 and 70.

The system also includes a feed bar 72 (FIGS. 2, 3, and 4) suitable for recharging the battery 62 from a fixed electrical charger 74 (FIG. 4). The feed bar 72 comprises a flat spring which is fixed beneath the wall 48 of the drive unit 26 by insulating mechanical means 76 close to the rear wall 44. The bar 72 extends substantially horizontally in the longitudinal direction of the cart so as to have a front end 78 and a rear end 80 respectively projecting beyond the front wall and the rear wall of the unit 26.

The rear end 80 of the recharging bar is fixed and curved downwards while its front end 78 is flexible and constitutes a ramp followed by a stop notch suitable for locking to the rear end 80' of the recharging bar 72' of the preceding cart 10' so as to provide electrical contact between the end 78 and the end 80'. A bimetallic strip 82 (FIG. 3) acting as a circuit breaker provides an electrical connection between the bar 72 and the positive terminal of the battery. The circuit breaker is operable by means of a stud 84 co-operating with the flexible front end 78 of the bar 72. As a result electrical connection is provided only when the front end has been deflected at least by a given amount.

In addition, as shown in FIGS. 2 and 4, the recharging bar 72 is connected to the positive terminal 64 of the battery via a diode 86 which allows current to flow only when the bar 72 is at a higher electrical voltage than the positive terminal of the battery.

The negative terminal 66 of the battery is directly connected to cart ground constituted by the chassis 12 (FIGS. 2 and 4).

Thus, when a first cart in a row is connected to the charger 74, both the recharging bar of the cart and cart chassis ground make respective electrical connections with the charger. The same applies from cart to cart for all the other carts waiting in a row. Thus, in accordance with the invention, electrical connection is provided in a particularly simple manner from cart to cart enabling the battery of each cart waiting in a row to be recharged. Recharging takes place only if the bar in the cart under consideration is at an electrical voltage which is higher than the voltage of the positive terminal of its battery.

The system also includes means for detecting the state of charge of its battery and declutching means for declutching the motor 52 when the battery charge is less than a predetermined reference value. This prevents the battery from being fully discharged by accident, which could lead to it wearing out prematurely.

Reference is now made to FIG. 5 which shows the manual control member 34 placed beneath the push bar 22 of the cart. The member 34 is in the form of a handle fixed to the shaft 36 which is itself placed close to one of the two substantially vertical risers 88 forming parts of the chassis 12. These two risers 88 carry the push bar 22 at their top end.

The member 34 is suitable for pivoting either towards the front of the cart in order to cause it to move forwards, or else towards the rear of the cart in order to cause it to move backwards, with the forwards and backwards positions being on either side of a neutral position (shown in FIG. 5) where the motor is not switched on. The speed at which the cart moves forwards or backwards is proportional to the angle formed by the handle relative to its neutral position, and this is achieved by the potentiometer 78 which has a neutral position and which simultaneously constitutes a reversing switch.

As shown in FIG. 5, a spring blade 90 is also provided co-operating with a slideway 92 on the handle and serving to urge the handle resiliently towards it neutral position. If the user releases the handle, then the handle is returned towards its neutral position and the cart stops automatically.

As shown in FIG. 1, the chassis 12 is provided at its front end 12a with a bumper 94 disposed transversely and horizontally. The bumper is constituted by a flexible hollow pipe which is closed at both ends 96 and 98 (FIG. 6). The pipe 94 is connected at an intermediate point along its length to one end 100 of a tube 102 whose other end 104 terminates at a pressure sensor 106 situated in the processor unit 26. The sensor is suitable for acting on motor control via a switch 108 for tripping a safety cycle whenver the flexible pipe is crushed or compressed by a shock.

Reference is now made to FIGS. 7 and 8. The wheel 18 and the toothed pulley wheel 32 are supported by a pin 110 passing through a needle-bearing cage 112 and passing through two half-supports 114 and 116 fixed in appropriate manner to the chassis 12.

As shown in FIG. 7, the rear end 12b of the chassis is provided with a coupling hook 118 suitable for towing the wheelchair of a handicapped person, should that be necessary.

In a variant embodiment shown in FIGS. 9 and 10, which are now referred to, drive is provided via swivelling wheels. In the example shown, a twinned pair of wheels 120 is used, as carried by a support 122 which is in turn carried by a hollow vertical shaft 124. This shaft is rotatably mounted on a horizontal flange 126 forming part of a bracket 128 fixed to the chassis 12. Ball bearings 130 are interposed between the bottom face of the flange 126 and a top circular face 132 of the support 122. A vertical transmission shaft 134 driven by a universal joint 136 passes through the hollow shaft 124. The transmission shaft 132 carries an endless screw or worm gear 138 which rotates a tangential gear wheel 140 containing an epicyclic gear train 142. This gear train has two horizontal outlet shafts 144 which drive respective ones of the two twinned wheels 120.

A cart can thus be fitted with two pairs of twinned wheels either at the front or at the back, or indeed with four pairs of twinned wheels constituting both steerable and swivelling wheels. In any event, cart handling is facilitated since it is substantially capable of turning on itself.

Reference is now made to FIGS. 11 and 12 which show a variant of the embodiment shown in FIGS. 9 and 10, with common items being designated by the same reference numerals. In this variant, the endless screw 138 and the tangential wheel 140 are replaced by a helical gear 146 keyed to the shaft 134 and driving a horizontal axis helical gear 148 containing an epicyclic gear train 142 analogous to that shown in FIGS. 9 and 10. As before, the epicyclic gear train drives the two twinned wheels 120 via respective outlet shafts 144. The wheel support 122 includes an auxiliary support 150 which houses the gear 146.

In the embodiment shown in FIGS. 11 and 12, the shaft 134 is not driven by a universal joint, but by a conical transmission coupling constituted by two bevel gears 152 and 154. The gear 152 is keyed to a horizontal transmission shaft 156 whereas the gear 154 is keyed to the shaft 134.

Reference is now made to FIG. 13 which shows a shopping cart whose chassis 12 is provided at its rear end with two swivelling wheel supports (only one of which is visible in the figure), with each wheel support being of the type shown in FIGS. 9 and 10. The drive unit 26 is placed beneath the basket 20 and the two outlet shafts 58 from its differential gear are provided with respective bevel gears 158 driving meshing bevel gears 160 keyed to the ends of transmission shafts 162 whose opposite ends are connected to the universal joints 136. Drive is thus delivered via two pairs of twinned wheels situated at the rear of the cart. The two wheels situated at the front may be twinned wheels or otherwise, and they are preferably capable of swivelling in all directions.

In the embodiment shown in FIG. 14, to which reference is now made, a baggage cart 170 is shown having a chassis 172 and a load-carrying plate 174. In this example the processing unit 26 is disposed beneath the load-carrying plate. This unit drives two pairs of twinned wheels disposed at the rear end of the chassis, with each pair being carried by a support 122 of the type shown in FIGS. 11 and 12. Each output shaft 52 from the differential gear has a bevel gear 177 keyed thereon meshing with a bevel gear 178 keyed to the end of a transmission shaft 180 whose opposite end is connected to a universal joint 182. Each universal joint drives a horizontal transmission shaft 156 analogous to that shown in FIG. 11.

In the embodiment shown in FIG. 14, the front wheels of the cart 170 are twinned or otherwise and they are preferably capable of swivelling so as to make the cart easier to maneuver.

Naturally, in the embodiments shown in FIGS. 13 and 14, it would also be possible to motorize the front wheels by similar means.

Reference is now made to FIG. 15 which shows a motor 184 fixed on a support plate 186 and provided with a hollow drive shaft 188. One of the ends of the drive shaft 188 is keyed to a gear wheel 190 having outwardly directed teeth and co-operating with at least two intermediate gear wheels 192 each constituted by a gear wheel mounted to rotate freely on a pin 194 fixed to the support plate 186.

The intermediate gear wheels 192 co-operate with the inwardly directed teeth 196 of a ring 198 having an outer cylindrical face 200 guided by at least two wheels 202 each mounted to rotate freely about a respective pin 204 carried by the support plate 186. The ring 198 is connected via a cage 206 to a cylindrical body 208 constituting the body of a differential gear. This differential gear comprises two planet wheels 210 and two sun wheels 212, one of the sun wheels 202 is keyed to the end of an outlet shaft 214 running along the hollow shaft 188 and guided by ball bearings 216. The other sun wheel 212 is keyed to the end of an outlet shaft 218 which is guided through the body 208 by a ball bearing 220. This provides a motor and differential gear assembly of particularly compact structure which advantageously replaces the assembly shown in FIG. 2.

Figure 16:
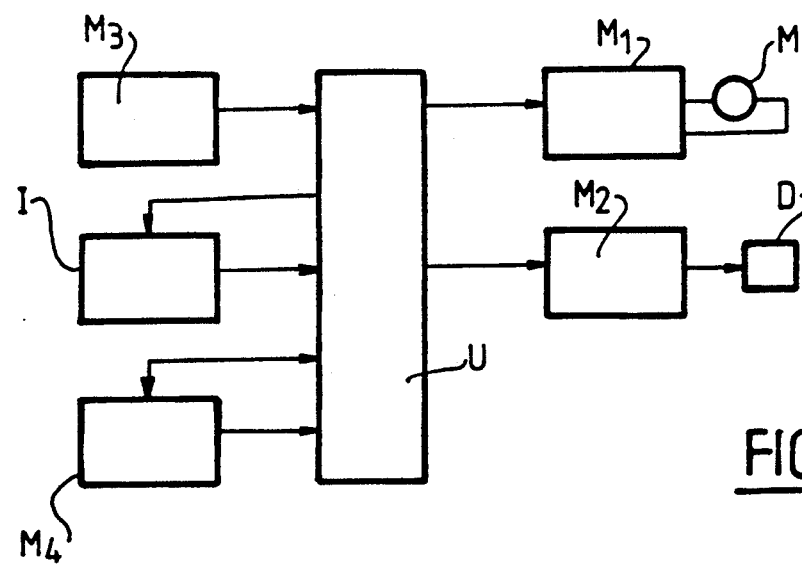
FIG. 16 is a block diagram of a control circuit.

Reference is now made to FIG. 16 which is a block diagram of a control circuit suitable for forming a part of the system of the invention.

The control circuit comprises means M1 for controlling the power delivered to a motor M, and means M2 for controlling a clutch D, with the means M1 and M2 being controlled by a microprocessor type of central unit U. The motor M is a D.C. motor suitable for motorizing the cart via appropriate transmission means, as described above. The clutch D is interposed between the motor M and the transmission members such that when in the declutched state the cart is not motorized, and when in the clutched state, the cart is motorized.

In order to control the means M1 and M2, the central unit U is connected firstly to means M3 for detecting a battery threshold, and secondly to an interface I for dialog with a user, said interface being suitable for providing information relating to the direction in which the motor is turning and also to its speed. In practice, this interface is controlled by the control member 34 provided beneath the push bar of the cart.

The central unit U is also connected to means M4 for detecting shocks, said means being controlled by the front bumper 94.

Figure 17:
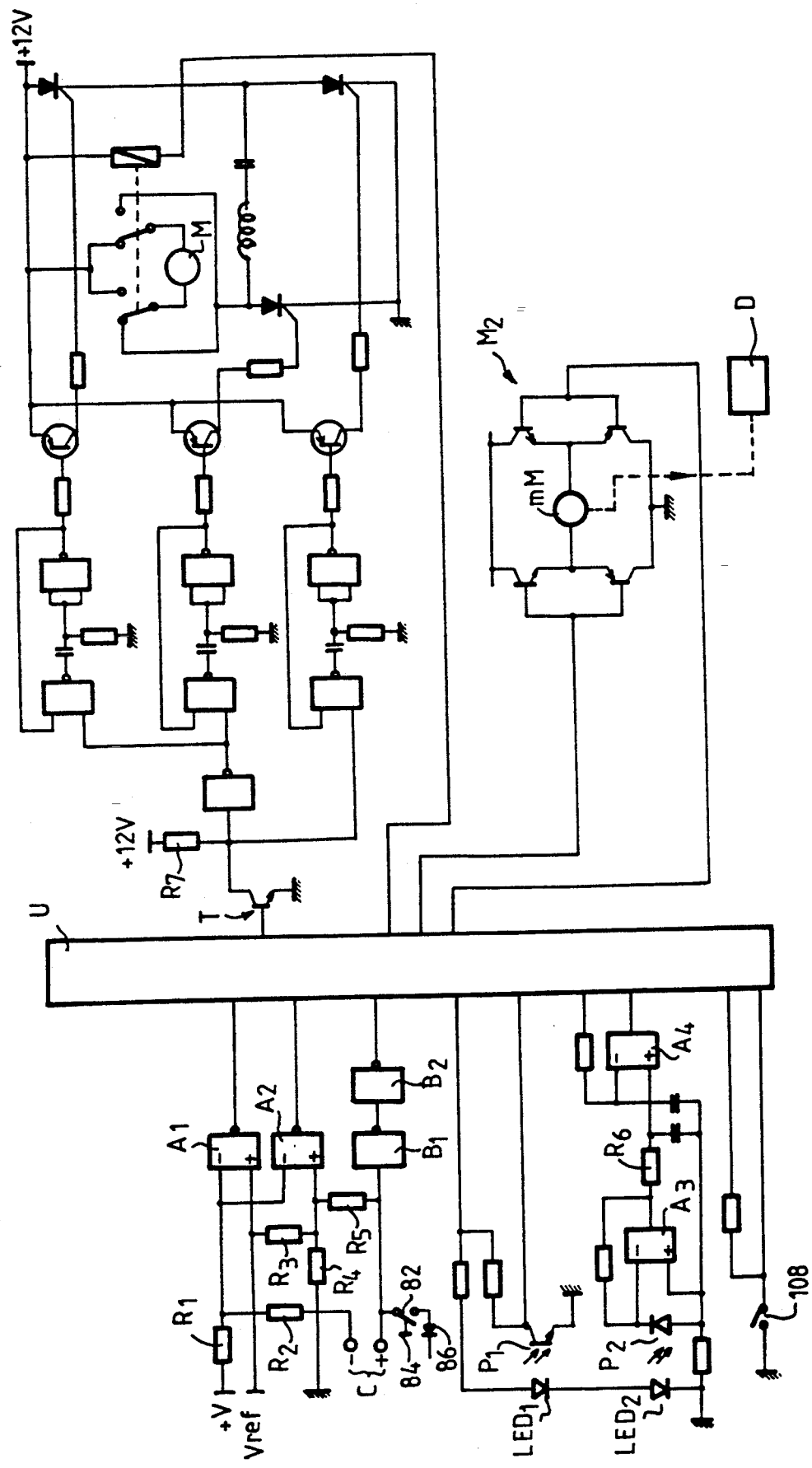
FIG. 17 is a circuit diagram corresponding to FIG. 16.

The battery threshold detector means M3 comprise a comparator having two thresholds constituted, in conventional manner, by two operational amplifiers A1 and A2 (FIG. 17). The inverting input of amplifier A1 is connected firstly to the power supply voltage +V via a resistor R1 and secondly to ground via a resistor R2. It is also connected to the inverting input of the other amplifier A2. The non-inverting input of amplifier A1 is connected firstly to a reference voltage VREF and secondly to the non-inverting input of amplifier A2 via a resistor A3. The non-inverting input of amplifier A2 is also connected to ground via a resistor R4 and to the positive terminal of a battery charger C via a resistor R5. When contact is established via the bimetallic strip 52 as actuated by the stud 84 (see FIG. 3), this makes it possible to reset bistables B1 and B2 connected to the central unit U, thereby indicating that the battery charge detection threshold is sufficient, thereby enabling the central unit to control the clutch D so as to engage the motor M with the transmission means.

The means for determining the direction in which the motor is running are constituted by an electro-optical potentiometer comprising a light emitting diode LED1 activating a photo transistor P1, and the means suitable for determining the speed of the motor also comprise a light emitting diode LED2 controlling a photodiode P2 connected to the central unit U via an amplifier circuit having two operational amplifiers A3 and A4. The cathode of photodiode P2 is connected to the inverting input of amplifier A3 whose non-inverting input is connected to the anode of the same photodiode. The output from amplifier A3 is connected to the non-inverting input of amplifier A4 via a resistor R6. The output from amplifier A4 is connected to the central unit U and also to its own inverting input.

The bump detection means M4 are constituted by the switch 108 described above with reference to FIG. 6. This switch is either open or closed in such a manner that the corresponding input of the central unit U is either left floating or else is connected to ground.

The clutch control means M2 are constituted in conventional manner by a four-transistor Darlington type circuit. These means control the clutch D via an electrical micromotor mM.

The means M1 controlling the application of power to the motor M have an input transistor T (FIG. 17) whose emitter is connected to ground, whose base is connected to the central unit, and whose collector is connected to a voltage +V via a collector resistor R7. The central unit thus controls the control means M1 via the transistor. Downstream from the transistor T there is a conventional thyristor current chopper circuit.

When battery voltage is greater than a threshold corresponding to a determined reference value, all instructions are performed normally by the central unit. When the threshold is reached, the central unit causes the motor to be declutched, after stopping the motor and inhibiting detection both of its speed and of its direction of rotation. The motor is thus declutched automatically when the power supply battery is getting low, thereby enabling the cart to be used normally while preventing the battery from being fully discharged.

I claim:

1. A system for motorizing a shopping cart or the like, said cart comprising a chassis provided with wheels, a push bar, and load-carrying means, said chassis having a front end and a rear end such that the front end is suitable for being nested in the rear end of an identical cart preceding it in a row of carts, the system comprising:

a) a drive unit including an electric motor and a motor control unit;
b) a manual control member situated close to the push bar and suitable for acting on the control circuit for controlling both forwards and backwards displacement of the cart;
c) transmission means between the motor and at least one wheel of the cart;
d) a rechargeable storage battery for powering the motor;
e) a feed bar suitable for recharging the battery from a fixed electrical charger, said recharging bar being formed by a flat spring which is fixed to the drive unit by insulating mechanical means and which projects beyond the front and the rear of the drive unit, said recharging bar having a front end and a rear end such that its front end is suitable for forming an electrical contact with the rear end of the bar of the preceding cart in a row, with the recharging bar of the first cart in a row being connected directly to a terminal of the charger;
f) means for providing an electrical connection between said bar and the positive terminal of the battery, when said electrical contact is established between the two above-mentioned bars;
g) a permanent electrical connection between ground constituted by the chassis and the negative terminal of the battery; and
h) means for providing an electrical connection between the ground of the chassis of the cart and another terminal of the charger.

2. A system according to claim 1, in which the electric motor drives a differential gear via a stepdown gear, the differential gear having two outlet shafts each of which is coupled to at least one wheel by said transmission means.

3. A system according to claim 1, in which the recharging bar is connected to the positive terminal of the battery via a diode which allows electrical current to flow only when the electrical tension of the bar is greater than the tension of the positive terminal of the battery.

4. A system according to claim 1, further provided with means for detecting the state of charge of the battery and declutching means coupled to said detection means for declutching the motor when the battery charge is below a predetermined reference value.

5. A system according to claim 1, in which the chassis of the cart is provided at its front end with a bumper constituted by a flexible pipe closed at both ends and connected at an intermediate point along its length to one end of a tube whose other end connects with a pressure sensor situated in the processor unit and suitable for acting to trigger a safety cycle whenever the flexible tube is crushed or compressed by a shock.

6. A system according to claim 2, in which each of the output shafts from the differential gear is provided with a respective toothed pulley wheel driving, by means of a cog belt, a corresponding toothed pulley wheel which is coaxial with a non-swivelling wheel of the cart and which is constrained to rotate together with said wheel.

7. A system according to claim 2, in which each of the outlet shafts of the differential gear drives a vertical transmission shaft disposed coaxially inside a hollow shaft which carries a support for a swivelling wheel, said transmission shaft causing said swivelling wheel to rotate.

8. A system according to claim 7, in which the transmission shaft is rotated by the outlet shaft via a conical coupling and/or via universal joints.

9. A system according to claim 7, in which the transmission shaft is provided with an endless screw which rotates a tangential toothed wheel containing an epicyclic gear train, said gear train having two outlet shafts driving respective ones of two twinned wheels carried by the support.

10. A system according to claim 7, in which the transmission shaft is provided with a helical gear driving a helical gear containing an epicyclic gear train, said gear train having two outlet shafts driving respective ones of two twinned wheels carried by the support.

11. A system according to claim 1, in which coupling means are provided for towing a wheelchair of a handicapped person.

12. A system according to claim 2, in which the electric motor possesses a hollow shaft having a gear wheel keyed thereon for driving the differential gear, one of the two outlet shafts of the differential gear passing along the hollow shaft.

13. A system according to claim 1, in which the control circuit includes an electro-optical potentiometer for controlling the direction in which the motor rotates and for controlling its speed of rotation.

14. A system for motorizing a shopping cart or the like, said cart comprising a chassis provided with wheels, a push bar, and load-carrying means, said chassis having a front end and a rear end such that the front end is suitable for being nested in the rear end of an identical cart preceding it in a row of carts, the system comprising:
   a) a drive unit including an electric motor and a motor control circuit;
   b) a manual control member situated close to the push bar and suitable for acting on the control circuit for controlling both forwards and backwards displacement of the cart;
   c) transmission means between the motor and at least one wheel of the cart;
   d) a rechargeable storage battery for powering the motor;
   e) a feed bar suitable for recharging the battery from a fixed electrical charger, the recharging bar is formed by a flat spring which is fixed to the drive unit by insulating mechanical means and which projects beyond the front and the rear of the drive unit, said bar having a front end and a rear end such that its front end is suitable for forming an electrical contact with the rear end of the bar of the preceding cart in a row, with the recharging bar of the first cart in a row being connected directly to the charger;
   f) means for providing an electrical connection between said bar and the positive terminal of the battery, when said electrical contact is established between the two above-mentioned bars; and
   g) a permanent electrical connection between ground constituted by the chassis and the negative terminal of the battery.

15. A system according to claim 14, in which the rear end of the recharging bar is fixed and is curved downwards while its front end is flexible and forms a ramp followed by a stop notch suitable for locking to the rear end of the recharging bar of the preceding cart in order to provide electrical contact between said flexible front end and said fixed rear end, the means for providing an electrical contact between the bar and the positive terminal of the battery including a circuit breaker controlled by the flexible front end of the bar with the electrical connection being established when the front end has deflected by a given amount.

16. A system for motorizing a shopping cart or the like, said cart comprising a chassis provided with wheels, a push bar, and load-carrying means, said chassis having a front end and a rear end such that the front end is suitable for being nested in the rear end of an identical cart preceding it in a row of carts, the system comprising:
   a) a drive unit including an electric motor and a motor control circuit;
   b) a manual control member situated close to the push bar and suitable for acting on the control circuit for controlling both forwards and backwards displacement of the cart, the manual control member comprises a handle placed beneath the push bar and fixed to one of the two ends of a substantially vertical shaft whose opposite end is connected to a potentiometer forming a part of the motor control circuit;
   c) transmission means between the motor and at least one wheel of the cart;
   d) a rechargeable storage battery for powering the motor;
   e) a feed bar suitable for recharging the battery from a fixed electrical charger, said bar having a front end and a rear end such that its front end is suitable for forming an electrical contact with the rear end of the bar of the preceding cart in a row, with the recharging bar of the first cart in a row being connected directly to the charger;
   f) means for providing an electrical connection between said bar and the positive terminal of the battery, when said electrical contact is established between the two above-mentioned bars; and
   g) a permanent electrical connection between ground constituted by the chassis and the negative terminal of the battery.

17. A system according to claim 16, in which the handle is suitable for pivoting forwards and backwards on either side of a neutral position, to cause the cart to move forwards and backwards respectively about the neutral position where the motor is switched off.

18. A system according to claim 17, in which a spring blade is provided for urging said handle towards its neutral position.

* * * * *